(12) United States Patent
Jeganathan et al.

(10) Patent No.: US 8,862,906 B2
(45) Date of Patent: Oct. 14, 2014

(54) CONTROL OF PLATFORM POWER CONSUMPTION USING COORDINATION OF PLATFORM POWER MANAGEMENT AND DISPLAY POWER MANAGEMENT

(75) Inventors: Nithyananda S. Jeganathan, Portland, OR (US); Paul S. Diefenbaugh, Portland, OR (US); Kyungtae Han, Portland, OR (US); Jinjun Liu, Elk Grove, CA (US); James A. Bish, Antelope, CA (US); Paul C. Drews, Gaston, OR (US)

(73) Assignee: Intel Corporation, Santa Clara, CA (US)

( * ) Notice: Subject to any disclaimer, the term of this patent is extended or adjusted under 35 U.S.C. 154(b) by 418 days.

(21) Appl. No.: 13/078,845

(22) Filed: Apr. 1, 2011

(65) Prior Publication Data

US 2012/0254645 A1 Oct. 4, 2012

(51) Int. Cl.
*G06T 1/60* (2006.01)
*G06F 1/32* (2006.01)
*G09G 5/395* (2006.01)
*G06F 3/14* (2006.01)
*G09G 5/36* (2006.01)

(52) U.S. Cl.
CPC ............. *G06F 1/3265* (2013.01); *G09G 5/395* (2013.01); *G09G 2330/021* (2013.01); *Y02B 60/1242* (2013.01); *G06F 3/1415* (2013.01); *G09G 5/363* (2013.01)
USPC ........... 713/300; 713/310; 713/320; 713/321; 713/322; 713/323; 713/324; 713/330; 713/340; 375/221; 345/530; 345/545; 345/619

(58) Field of Classification Search
USPC ................ 713/300, 310, 320–324, 330, 340; 375/221; 345/530, 545, 619
See application file for complete search history.

(56) References Cited

U.S. PATENT DOCUMENTS

| | | | |
|---|---|---|---|
| 7,616,208 B2 * | 11/2009 | Lauder | 345/530 |
| 7,777,754 B2 | 8/2010 | Hochmuth et al. | |
| 2008/0174606 A1 * | 7/2008 | Rengarajan et al. | 345/531 |
| 2008/0238928 A1 | 10/2008 | Poddar et al. | |
| 2009/0204957 A1 | 8/2009 | Nishibayashi et al. | |
| 2010/0321402 A1 | 12/2010 | Han et al. | |

OTHER PUBLICATIONS

"Advanced Configuration and Power Interface Specification", Hewlett-Packard Corporation, Intel Corporation, Microsoft Corporation, Phoenix Technologies Ltd., Toshiba Corporation, Revision 4.0a, Apr. 5, 2010, 731 pages.
"MIPI Alliance Specification for Display Command Set", Mobile Industry Processor Interface, Version 1.02.00, Copyright 2006-2009 MIPI Alliance, Inc., Jul. 23, 2009, 128 pages.

(Continued)

*Primary Examiner* — M Elamin
(74) *Attorney, Agent, or Firm* — Blakely, Sokoloff, Taylor & Zafman LLP

(57) ABSTRACT

Control of platform control of platform power consumption using selective updating of a display image. An embodiment of an apparatus includes a display controller to transfer pixel data from a frame buffer to a video display and a detection element to track updates to the frame buffer, the detection element to identify a portion of the pixel data that has been changed from a previous image, where the display controller is to provide the video display with the identified portion of the pixel data.

27 Claims, 14 Drawing Sheets

(56) References Cited

OTHER PUBLICATIONS

"MIPI Alliance Specification for Display Serial Interface", Mobile Industry Processor Interface, Version 1.02.00-2, Copyright 2005-2010 MIPI Alliance, Inc., Jun. 28, 2010, 96 pages.
"MIPI Alliance Standard for Display Bus Interface", Mobile Industry Processor Interface, Version 2.0, Copyright 2005 MIPI Alliance, Inc., Nov. 16, 2005, 65 pages.
"MIPI Alliance Standard for Display Pixel Interface (DPI-2)", Mobile Industry Processor Interface, Version 2.00, Copyright 2005-2006 MIPI Alliance, Inc., Jan. 23, 2006, 34 pages.
Kwa, Seh, et al., "PCI Express Architecture Power Management", Rev 1.1, Intel Corporation, Nov. 8, 2002, 15 pages.
International Search Report and Written Opinion mailed Jun. 11, 2012, in International Application No. PCT/US2011/061727, 7 pages.
Official Letter dated Apr. 24, 2014, in R.O.C. (Taiwanese) Patent Application No. 100145967 (+ English translation), 12 pages.

* cited by examiner

IIM Register
930

US 8,862,906 B2

CONTROL OF PLATFORM POWER CONSUMPTION USING COORDINATION OF PLATFORM POWER MANAGEMENT AND DISPLAY POWER MANAGEMENT

TECHNICAL FIELD

Embodiments of the invention generally relate to the field of electronic devices and, more particularly, to a method and apparatus for control of platform power consumption using selective updating of a display image.

BACKGROUND

Despite improvements in system design, mobile electronic devices and other systems consume a significant amount of power in operation. For this reason, systems utilize numerous different functions to reduce power consumption by, for example, turning off or reducing operation of system elements.

Among the most significant power-consuming elements of a system or device is the display subsystem, which is utilized to provide video data to a screen device.

However, conventional devices and processes are limited in their ability to manage power consumption efficiently. The operation of a display subsystem requires a significant amount of power to maintain screen images, where the power consumption generally continues as long as the screen display is active.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
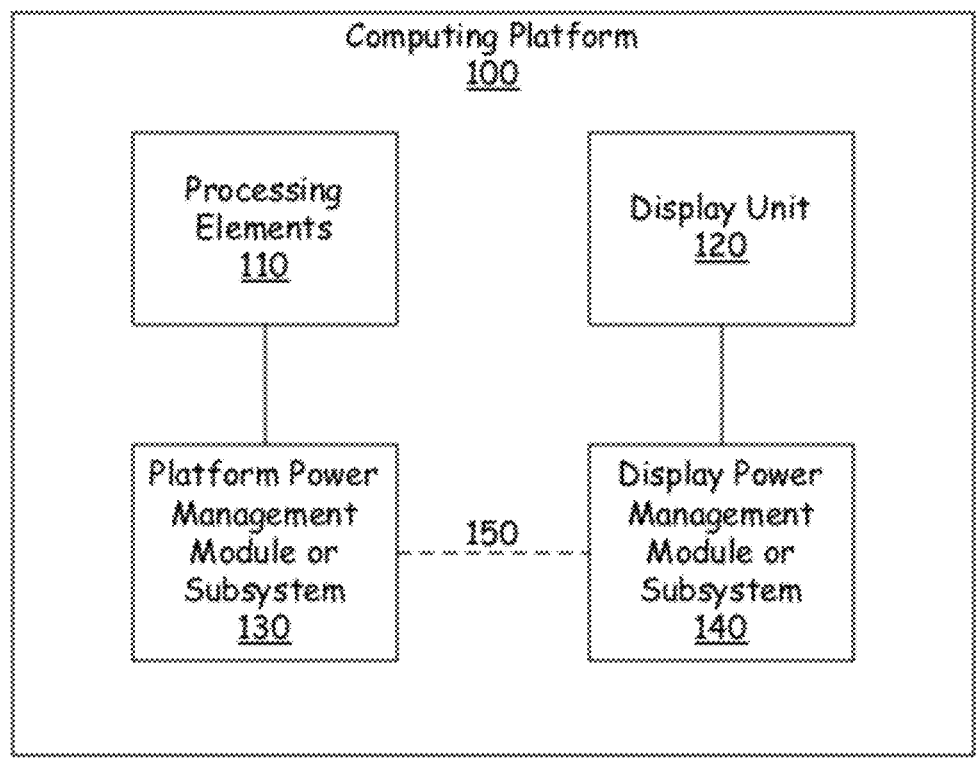
FIG. 1 is an illustration of an embodiment of a power management system for a computer platform.

Embodiments of the invention are generally directed to control of platform power consumption using selective updating of a display image.

As used herein:

"Mobile device" means a mobile electronic device or system including a cellular phone, smart phone, mobile Internet device (MID), handheld computers, personal digital assistants (PDAs), and other similar devices.

In some embodiments, a method, apparatus, or system provides for selective update of a display screen. In some embodiments, the selective update provides for only transmitting portions of an image that have been changed since transmission of a prior image.

In some embodiments, a method, apparatus, or system includes coordination between platform power management and display power management to control power consumption of a computing platform. A computing platform includes any platform providing computing operations, including, but not limited to, a mobile device. In some embodiments, a computing platform operates to recognize display power management operations in order to transition to or remain in a lower power state when display operations are not required.

Conventional display subsystems are among the most power consuming devices on mobile platforms, and a significant amount of power is expended in maintaining the contents of display. The constant activity to refresh and maintain the display contents has a significant impact on the battery life of mobile devices. In conventional operation, as long as the display is active, the following tasks are performed: (1) Servicing the display synchronizing interrupt (Vblank) for each video frame; and (2) Transmitting the complete frame buffer (FB) contents to the video display, where the frame buffer is the memory location of the platform that stores the color information (pixel data) of the video screen image to be displayed. Such operations consume a significant amount of power in a device, and such operations are followed in a conventional operation regardless of the amount of change that occurs in a video image.

In some embodiments, an apparatus, system, or process provides for a selective update of a video display, in which only portions of an image that are changed (referred to herein as "damage") are updated. In some embodiments, a process (which may be referred to herein as selective pixel update (SPU) or display partial update (DPU)), provides for partial screen updates for an apparatus or system. In some embodiments, the apparatus, system, or process may utilize selective updates of a display to reduce the active time for the display, and thus may yield a significant power savings for a computing platform.

In conventional computing platforms, a display pipeline generally cannot enter low power mode when the display is actively being modified. In such operation, the display subsystem will not be turned off unless there is a significant period of idleness on the platform. Until the display enters a power saving mode, the platform is generally required to stay in high power consumption modes to service the display requests even if the rest of the platform is quiescent. In a mobile device, the impact of servicing the constant display related requests generates a significant drain on the battery life of the device. In some embodiments, a platform provides for integration of display power management with platform power management in order to allow the platform to transition to lower power states or to remain in lower power states for a greater amount of time.

Display partial update (DPU) addresses in part the problem of excessive power consumption by transmitting only the modified area of the screen to the display, thus saving power due to reduced display traffic. However, although DPU achieves longer idleness between display updates in the display pipeline, conventional technology is not optimized to work in conjunction with other platform power management techniques. A conventional system does not take into account the semantics of platform power management, and hence, by operating independently, there is no opportunity to save power in a computing platform by coherently entering low power modes by the various sub-systems.

In some embodiments, a method, apparatus, or system ties display power management technology, such as DPU technology, with the platform power management infrastructure in order to provide more fine-grained power control and achieve greater power savings on the platform in the active mode. In some embodiments, a method, apparatus, or system includes coordination between a platform power management and display power management to control power consumption of a computing platform. In some embodiments, a method, apparatus, or system ties platform power management framework technology with selective pixel update technology. In some embodiments, a method, apparatus or system utilizes coordination between SPU technology and the platform power management infrastructure to achieve greater power savings on the platform in the active mode.

In some embodiments, an apparatus, system, or process providing selective pixel update provides an operation that transmits only the area of the screen that is modified to the video display. In some embodiments, an apparatus, system, or method captures screen changes (referred to as damage) and leverages the hardware features to reduce power consumption on the platform and in the display link.

In some embodiments, an apparatus or system for selective pixel update includes the following hardware elements: (1) a video display having its own full frame buffer and having the ability to retain images when no screen updates are sent; (2) a hardware controller that support a feature for sending a partial frame buffer to the video display.

In conventional systems, hardware may include, for example, a MIPI™ (Mobile Industry Processor Interface) Type 1 display panel, where the MIPI Display has the ability to store one full frame buffer of data and can refresh its screen contents from this remote frame buffer. Among conventional elements, a MIPI controller may operate to provide a reduced frame buffer to panel side hardware, but the mode of the controller is a special use-case for displaying in a smaller area of the screen, with the rest of the screen being black. A MIPI controller has no ability to track the changes for a screen and only update that specific area.

In some embodiments, an apparatus or system includes hardware to track the frame buffer changes. In some embodiments, selective pixel update utilizes the existing infrastructure available on Linux windowing system (X framework) called "damage extension" (DEx) for tracking the changes that occur on the screen (the screen damage).

Based on different workloads for a computing platform, it may be shown that, on an average, only 10% of the pixels in a display are modified per active frame. As SPU transmits only the modified portion of the frame buffer, the display and memory link activity may be reduced significantly, potentially by 90% if only 10% of pixels are changed. In some embodiments, the reduced screen updates may be utilized to enable a platform to enter deeper sleep modes, and to allow display link to transition to a low power mode (using clock or power gating for the display elements).

In some embodiments, an SPU approach towards display power management is two-fold: The software tracks the changes on the screen and presents the area of modified pixels as a rectangle, and the hardware is capable of sending only the damaged area of the frame buffer to the remote frame buffer. In some embodiments, the operation enables the display link to be active for a much shorter duration than in conventional systems, and, if no activity occurs on screen, the display refreshes its contents out of the remote frame buffer rather than the local frame buffer, thereby providing savings on memory power as well. In some embodiments, the software tracking of screen damage may also be implemented as a fixed-function hardware leading to provide additional power and performance improvement.

In typical operation, even if a display is being updated actively (such as in Web browsing or video playback), there are meaningful idle periods that occur in the system between display updates. In some operations, the idle periods are leveraged by a platform power management controller to enable a lower power consuming state at certain intervals. The lower power platform power modes are generally referred to herein as an Intermediate Idle Mode (IIM) (indicating idle power modes when the platform is in a S0 state, where S0 indicates a fully operational power state of a system). In operation, it is possible for the processor and other devices in a platform to consume less power while maintaining responsiveness that is near that of the S0 state. However, in conventional mobile platforms, the display pipeline generates constant bursts of activity on the memory, graphics and display control, thus preventing entry into IIM states. In some embodiments, with DPU technology, idleness between frames may be increased, thus assisting in increased residency in IIM states.

However, from a platform perspective, a display pipeline is conventionally treated as an independent module, without coordination between the platform power management controller's Power Management Unit (PMU) and a display pipeline. In some embodiments, a method, apparatus or system coordinates these entities to allow the system to remain in low power modes for longer periods and in certain scenarios to reduce the time spent in active states.

In some embodiments, in a combined DPU and IIM optimization, IIM decisions of the platform are conveyed to the DPU display driver to allow for reduction in power states and additional power savings in the platform, particularly during active scenarios. In some embodiments, the IIM state is utilized to provide guidance to assist the display driver in making informed decisions on power management in conjunction with the workload of the display pipeline.

In some embodiments, as a result of the optimizations for the display utilizing DPU and IIM co-ordination, increased idleness on the platform may be achieved. Because the display pipeline is a significant consumer of active mode power, increased idleness may provide for reduced power consumption in the system.

FIG. 1 is an illustration of an embodiment of a power management system for a computer platform. In some embodiments, a high level view of a computing platform 100 includes processing elements 110 and a display unit 120, among other elements that are not illustrated here. The computing platform 100 may be a mobile device operating on battery or other limited mobile power source. In some embodiments, the computing platform 110 includes systems for power management of the platform 110, including a platform power management unit module or subsystem 130 and a display power management module or subsystem 140 (where the modules or subsystems may include multiple components or functions of components). In some embodiments, the display power management module 140 may include functionality to provide display updates only when there are image changes (screen damage).

In some embodiments, the computing platform 100 provides for coordination 150 between the platform power management unit module 130 and a display power management module 140. In some embodiments, the computing platform 100 utilizes data for display power management to allow the computing platform to transition to or remain in a lower power active state (IIM) when display updates are not required.

Figure 2:
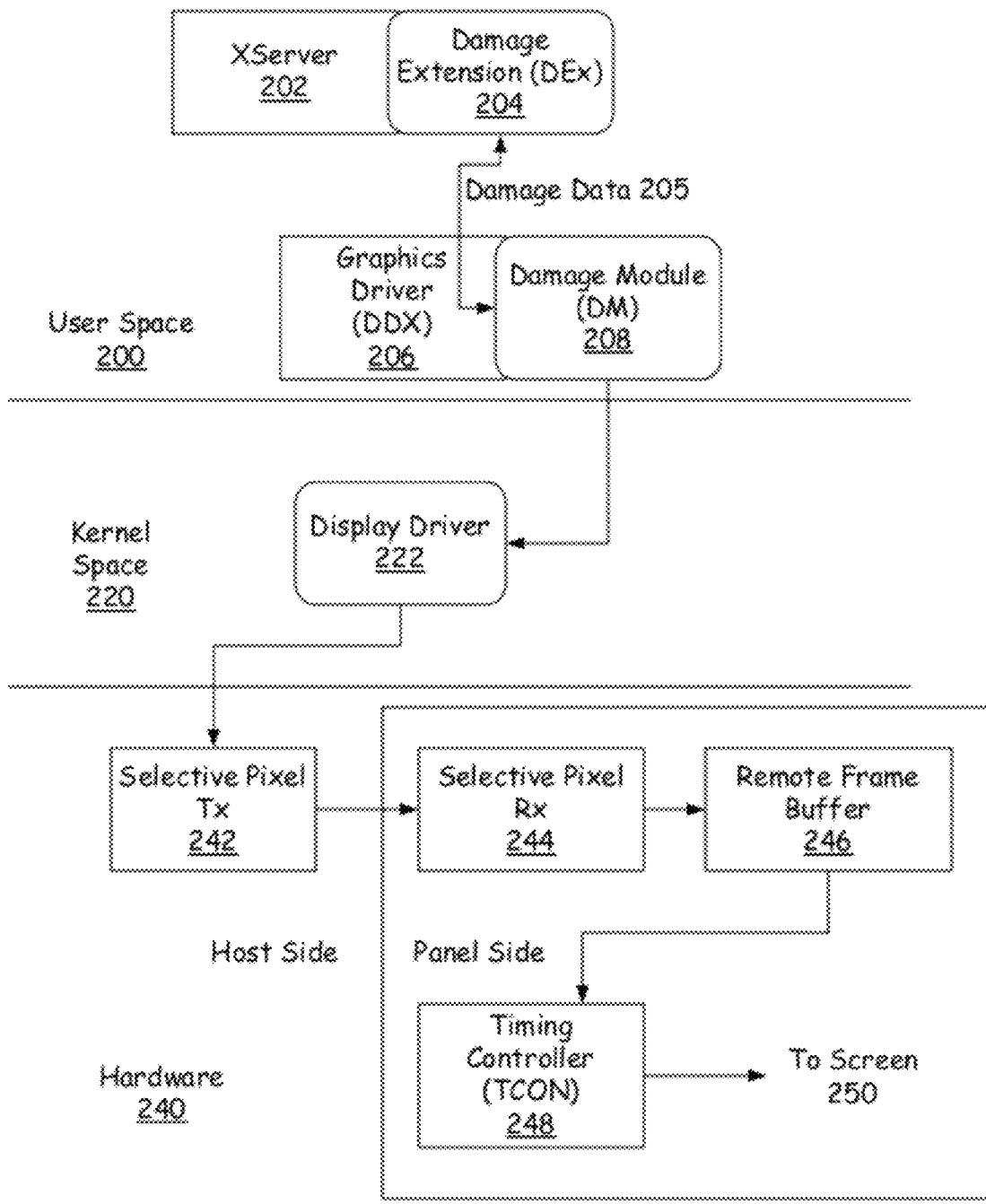
FIG. 2 is an illustration of an embodiment of a system for partial frame update.
Figure 3:
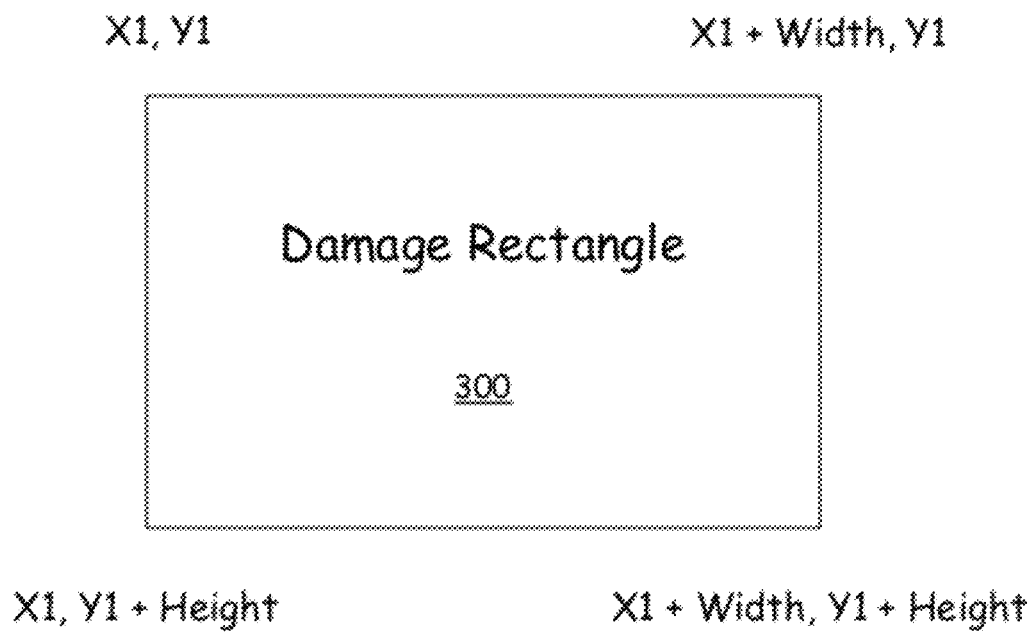
FIG. 3 is an illustration of a screen damage rectangle used in an embodiment of partial frame update.

FIG. 2 is an illustration of an embodiment of a system for display partial update. In this illustration, a system includes a user space 200 and a kernel space 220, together with certain hardware 240. In some embodiments, the user space includes an X server 202 with damage extension (DEx) 204 to generate damage data 205 reflecting changes to a screen image, the damage extension providing at least part of a damage detection element for the system. In some embodiments, the user space further includes a graphics driver (DDX) 206 and a damage module (DM) 208 to receive the damage data, where the damage module 208 initializes the SPU setup, and further performs a handshake with DEx 204 for receiving the screen damage notifications. In some embodiments, DEx 204 sends the pixel damage to the damage module 208 when there are 2-D changes on the root window (entire screen) in the form of Cartesian coordinates. In some embodiments, the damage module 208 checks for the validity of the data, and accumulates the damage for a time period of one frame (typical ~16.66 ms). In some embodiments, the accumulated damage data has 4 data points: {X1, Y1, Width, Height} that represent a rectangle. The four edges of the rectangle can be derived from these points, as shown in FIG. 3 described below.

In some embodiments, at the expiry of a frame time, pixel damage data is sent to a display driver 222 (illustrated in the kernel space 220) via an IOCTL (input/output control) interface. In some embodiments, the display driver 222 is responsible for configuring the display panel and a selective pixel transmitter (SPTx) 242 at startup, and for synchronizing the pixel data transfer.

In some embodiments, upon receiving a Vblank interrupt, the display driver 222 checks for pixel updates to a frame buffer, and, if present, then the display driver 222 configures the selective pixel transmitter 242 to transmit the damage area pixels to the panel side logic. In some embodiments, this operation completes the display activity on the host side, and it is the responsibility of the panel side logic to ensure the pixels are shown correctly. In some embodiments, if there is no update to the local frame buffer (no damage), then the selective pixel transmitter 242 is power-gated by the display driver 222 to low power mode until any new data needs to be sent to the remote frame buffer.

In some embodiments, a panel side logic module referred to as the selective pixel receiver (SPRx) 244 receives the pixels provided by the selective pixel transmitter 242 and updates a remote frame buffer 246 with the new data. In some embodiments, a timing controller (TCON) 248 operates to scan the remote frame buffer at the start of each new frame, with the pixel then provided to the screen 250 for display. In some embodiments, as the timing controller 248 will always refresh its contents from the remote frame buffer 246, the SPU technique provides a stable image even when there is no data sent to remote frame buffer 246. In some embodiments, the display activity will persist until the platform operates to remove the power from the display due to long inactivity (such as, a screensaver event).

FIG. 3 is an illustration of a screen damage rectangle used in an embodiment of display partial update. In some embodiments, a damage rectangle 300 may be defined by a point (X1, Y1) and the width and height of the damage rectangle. As illustrated, the damage rectangle includes four corner points defined by such data, the corner points being (X1, Y1), (X1+Width, Y1), (X1, Y1+Height), and (X1+Width, Y1+Height).

Figure 4:
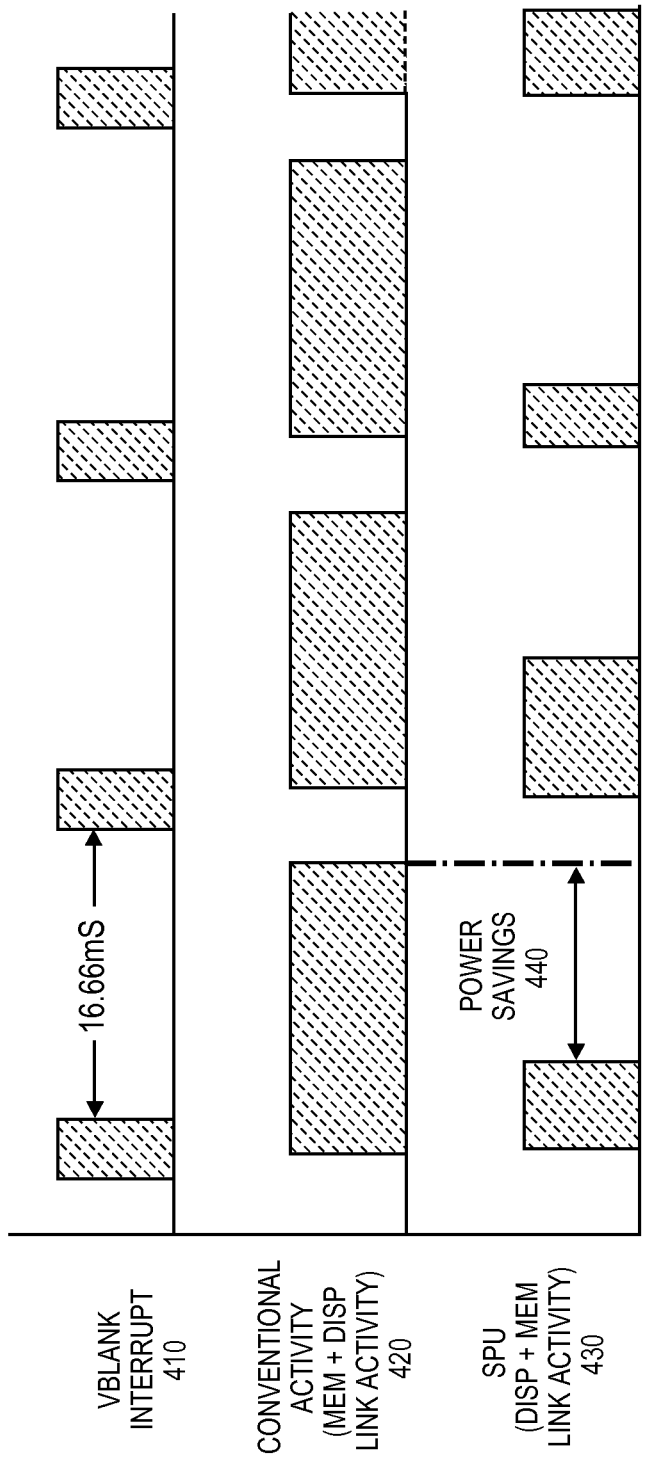
FIG. 4 is a timing diagram to illustrate power consumption by an embodiment of an apparatus or system using partial frame update.

FIG. 4 is a timing diagram to illustrate power consumption by an embodiment of an apparatus or system using display partial update. In some embodiments, a system platform may provide for video data transmission in frames according to a Vblank interrupt 410 (with frames of 16.66 msec). With conventional operation of memory and display link activity 420 there is substantial power cost even if there is little or no change to the data frame. In some embodiments, a selective pixel update system 430 allows for savings in power consumption 440 due to reduction in operation of the display pipeline to only transmit the damage rectangle containing the changes to the screen image.

Figure 5:
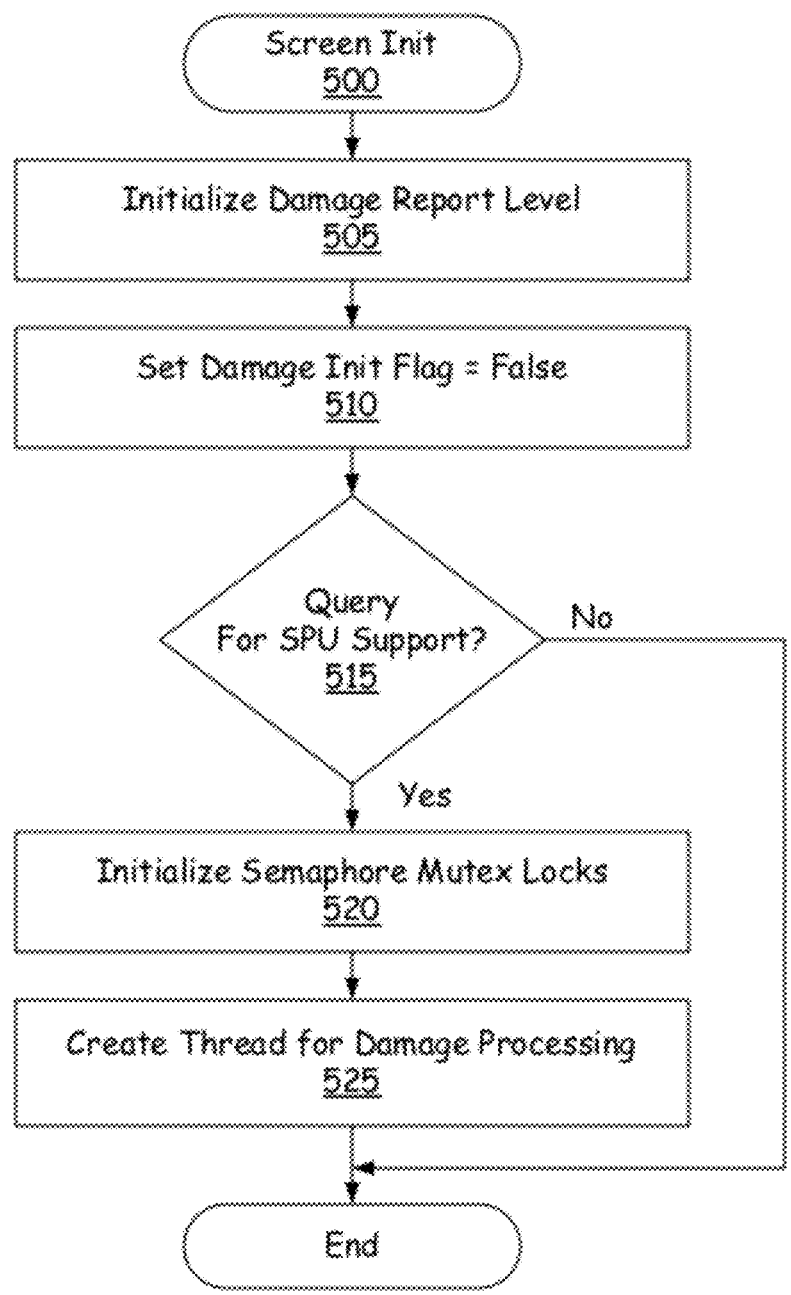
FIG. 5 is a flowchart to illustrate an embodiment of a process for screen damage processing.

FIG. 5 is a flowchart to illustrate an embodiment of a process for screen damage processing. In some embodiments, a process for screen initialization 500 includes initializing a screen damage report level for the screen image 505 and setting a flag for screen damage (Damage Init Flag) as false 510. If the system provides support for selective pixel update 515 then semaphore mutex (mutual exclusion object) locks are initialized 520 and a thread 525 is created for damage processing.

Figure 6:
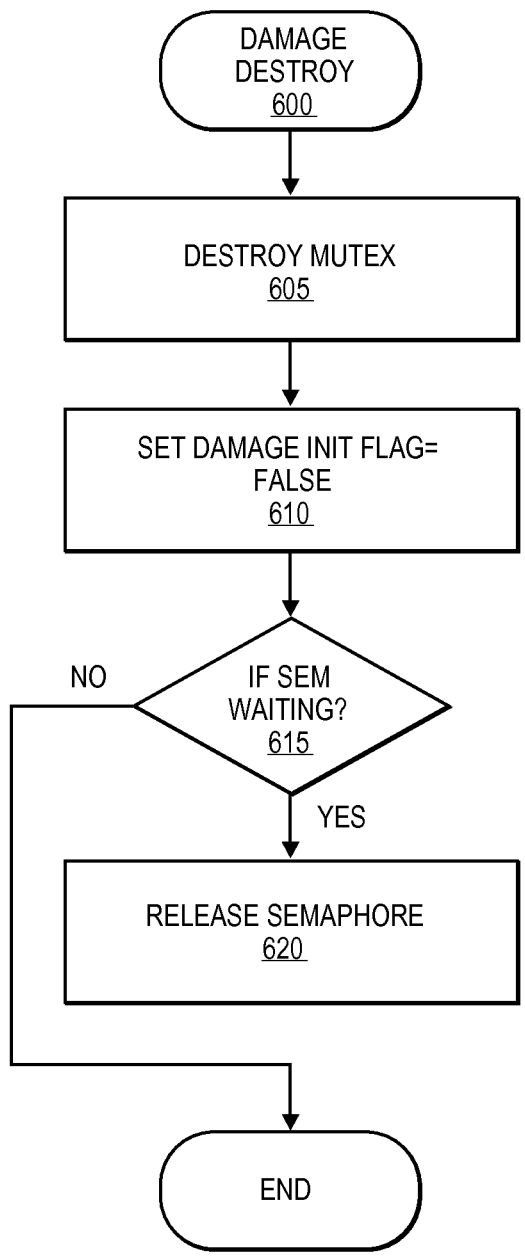
FIG. 6 is a flowchart to illustrate an embodiment of a process for handling screen damage.

FIG. 6 is a flowchart to illustrate an embodiment of a process for handling screen damage. In some embodiments, a process for handling damage 600 includes destroying the mutex object 605 and setting the Damage Init Flag to False 610. If a semaphore is waiting 615, then the semaphore is released 620.

Figure 7:
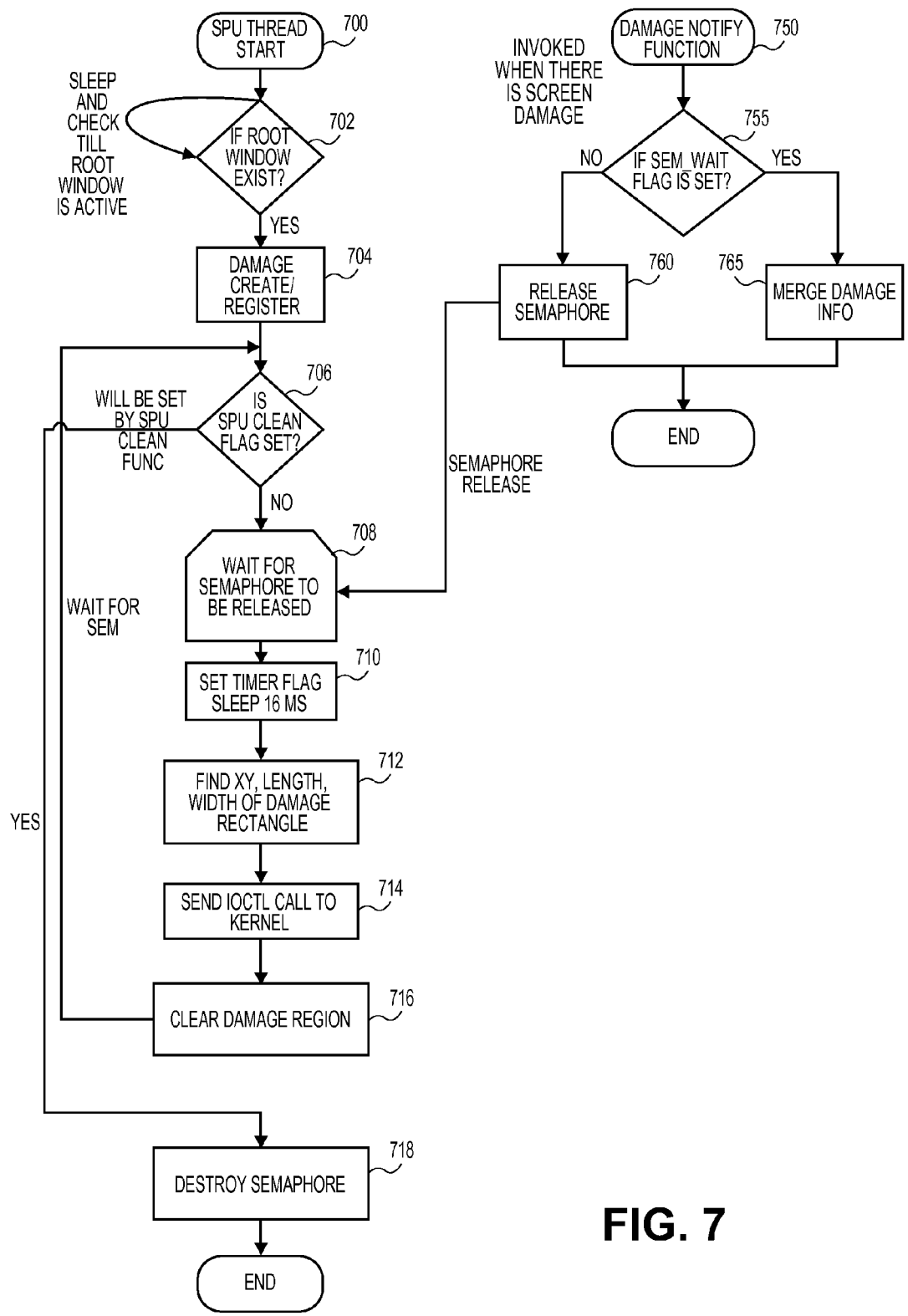
FIG. 7 is a flowchart to illustrate an embodiment of a process for partial screen updates.

FIG. 7 is a flowchart to illustrate an embodiment of a process for partial screen updates. In some embodiments, a process includes starting a selective pixel update thread 700. The process further includes determining if a root window exists 702. If not, the process sleeps and rechecks until the root window is active. Upon the root window existing there is a check of a damage create register 704. If an SPU Clean Flag is set 706, as set by an SPU clean function, then the semaphore object is destroyed 718 and the process is ended. If the SPU Clean Flag is not set, then there is a wait for the semaphore to be released 708.

In a process that may be running concurrently, a damage notification function 750 includes a determination whether a Semaphore Wait Flag is set 755. If so, there is a merger of damage information 765 and the function is ended. If not, the semaphore is released 760 to the selective pixel update thread 708 and the function is ended.

Upon the semaphore being released 708, a Timer Flag Sleep to a frame length (e.g. 16 msec) is set 710, and there is a determination of the identifying coordinates of the damage rectangle (X, Y, length, and width, as shown in FIG. 3) 712. An IOCTL call is made to the kernel 714 and the damage region is cleaned 716. The process then returns to the determination whether the SPU Clean Flag is set 706 and for waiting for a semaphore to be released 708.

Figure 8:
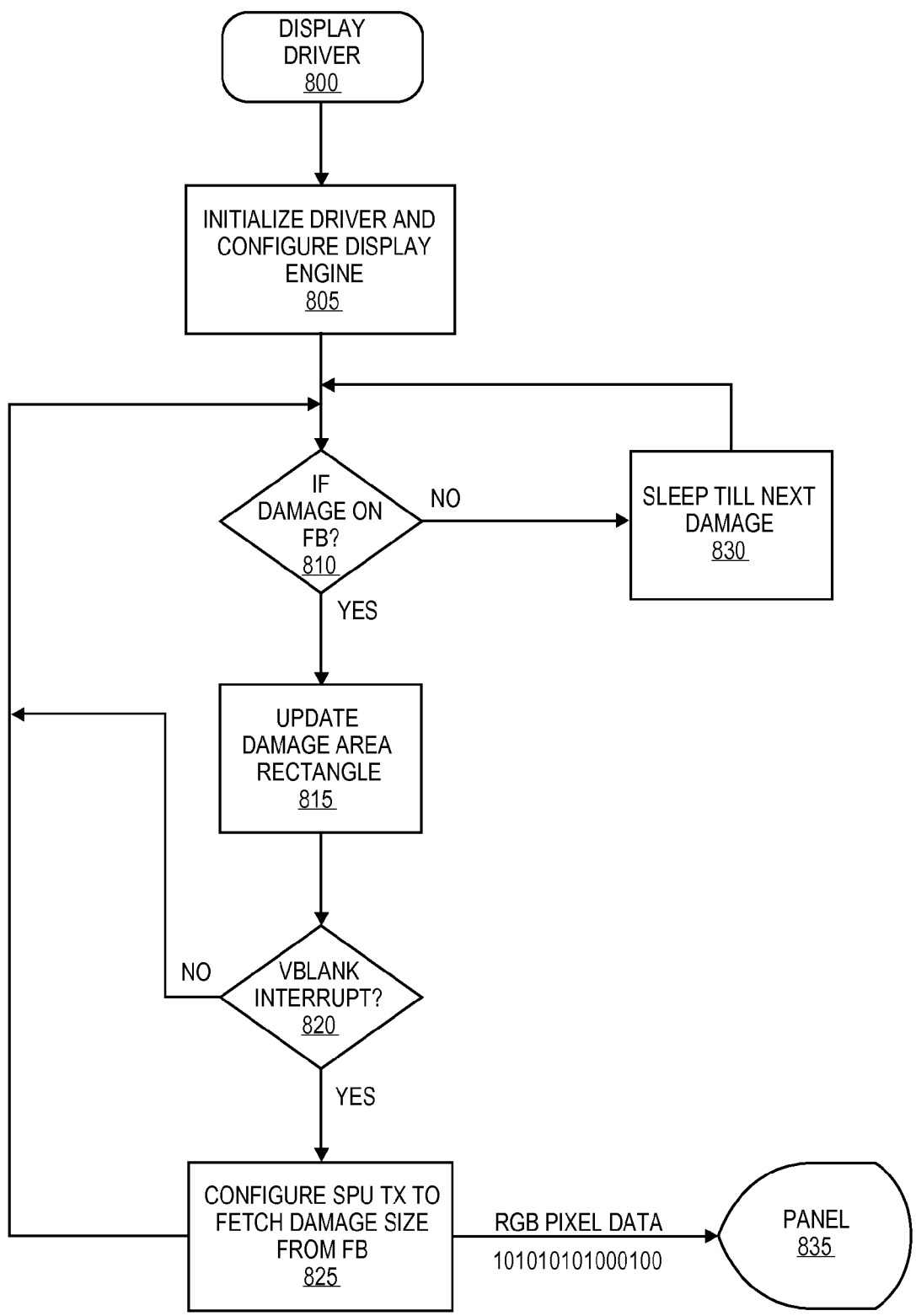
FIG. 8 is a flowchart to illustrate an embodiment of display driver operation for partial screen update.

FIG. 8 is a flowchart to illustrate an embodiment of display driver operation for partial screen update. In some embodiments, a process for a display driver 800 includes initializing the driver and configuring the display engine 805, and determining if there is damage in the frame buffer 810. If not, the process sleeps until there is damage 830. If there is damage, there is an update of the damage area rectangle 815. If a Vblank interrupt has not been received 820, the process returns to determining whether there is damage in the frame buffer 810. If a Vblank interrupt has been received, then there is configuration of the SPU transmitter to fetch the damage size from the frame buffer 825, and a transmission of the pixel data to the panel 835.

Figure 9:
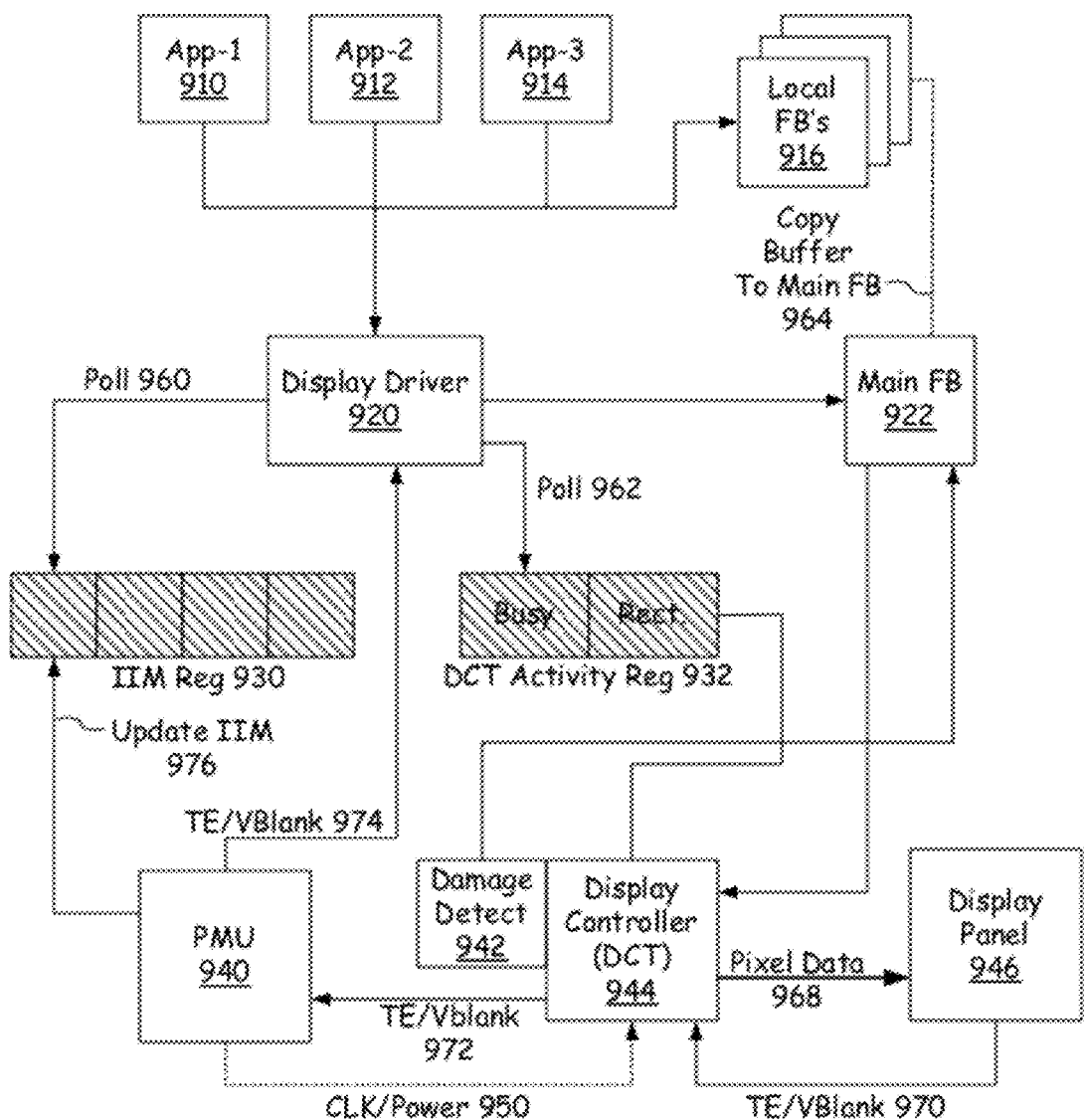
FIG. 9 is a block diagram to illustrate an embodiment of a system, apparatus, or process for platform power management.

FIG. 9 is a block diagram to illustrate an embodiment of a system, apparatus, or process for platform power management. FIG. 9 illustrates an embodiment of an apparatus or system that includes graphics and display pipeline control utilizing DPU and S0 coordination. Applications, such as App-1 910, App-2 912, and App-3 914, render graphics text and images onto local frame buffers (FB) 916 for such applications, the applications also providing such data to a display driver 920. At the start of each data frame (on the Vblank signal) the applications may copy 964 their local frame buffer data onto the main frame buffer 922. The data copied to the main frame buffer 922 is visible to a user after transmission to a display panel. In operation, a display controller (DCT) 944 is responsible for transferring contents of the main frame buffer 922 to the display panel 946, shown as the transfer of video (pixel) data 968 to the display 946. In this operation, a damage detection (DD) element 942 implemented either in software or hardware tracks the screen updates on the main frame buffer (the screen updates being referred to as damage to the image) and operates with the display controller to transmit only the modified portion of the frame buffer 922 to the display 946. As illustrated, the display 946 provides Vblank (vertical blanking interval) 970 interrupts to the display controller 944 to trigger the transmission of pixel data. In some embodiments, the display controller provides the Vblank interrupt 972 to a power management unit 940, which provides the data to the display driver 920.

In some embodiments, the computing platform 900 includes a display controller activity register or other memory element 932, which may include a rectangle element for portions (rectangles) of the screen having damage and a busy sector to indicate active display controller operations. In some embodiments, the computing platform 900 further includes a power level (IIM) register or other memory element 930 that receives updates 976 from the power management unit 940. In some embodiments, the display driver 920 operates to poll 960-962 the display controller activity registers 932 and the IIM register 930 to coordinate power management of the display (via the operations of the display controller 944 and damage detector 942) and power management of the platform (via the operation of the power management unit 940).

Figure 10:
FIG. 10 is an illustration of an activity register in an embodiment of a power management system.
Figure 10:
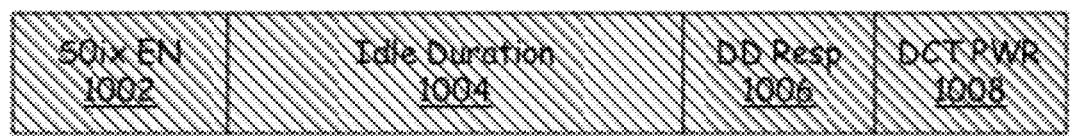

FIG. 10 is an illustration of an activity register in an embodiment of a power management system. In some embodiments, an activity register or other memory element 930 (also illustrated in FIG. 9) comprises a plurality of fields, where the fields may include a first field for enable status of reduced IIM power state 1002; a second field for idle duration 1004; a third field for display driver (DD) response 1006; and a fourth field for display controller power (DCT PWR) 1008.

In some embodiments, coordination of DPU and IIM power management optimizations may be utilized to improve the overall platform power management. In some embodiments, for the purpose of interconnecting the display power management with platform power management infrastructure, an apparatus or system includes at least two registers or other memory elements. In some embodiments, a first register or other memory element (IIM register) 930 for the power management unit (PMU) 940 is utilized to indicate the platform power management decisions to the display driver 920, and a second register or other memory element (DCT activity register) 932 is utilized for the display controller 944 to signal whether or not the display controller 944 is currently transmitting a frame (Busy status). In some embodiments, the DCT activity register 932 also receives the frame buffer rectangle (Rect) that the display controller 944 will send to the display 946 at the start of the Vblank interval.

In some embodiments, power control for a computing platform may be implemented in two ways: The platform is ready to enter IIM and the display power management decisions are made: (1) at a start of a Vblank interval; or (2) between Vblank intervals.

(I) Display Power Management Decision at Start of Vblank: In some embodiments, when a platform is prepared to enter into an IIM state, the power management unit indicates the platform state to the drivers via IIM register 930. This is illustrated in FIG. 9, in which display driver 920 receives the state information via the IIM register 930. A power management unit generally will make platform decisions faster than the display driver, and thus having an interrupt notification sent to the driver at every enable would have significant performance impact on the platform. In some embodiments, the display driver 920 operates to read this register at its own processing granularity time (such as at Vblank based on the received Vblank interrupt signal 974). In some embodiments, the behavior of the display driver 920 is based on the frame damage and expected duration of the data transmission. For this purpose, an "energy break-even" (EBE) time is defined as the minimum time that the display pipeline must remain in a low power mode to achieve enough energy savings to offset the amount of energy that will spent to enter ($E_{ent}$) into and exit ($E_{exit}$) out of the low power modes. The energy break even time may be expressed as:

$$\text{EBE time} = (E_{ent} + E_{exit}/\Delta\text{Power}) \qquad [5]$$

Or:

$$\text{EBE time} = ((P_{ent} \times T_{ent} + P_{exit} \times T_{exit})(P_{HP} - P_{LP})) \qquad [6]$$

Where:
$E_{ent} = P_{ent} \times T_{ent}$;
$E_{exit} = P_{exit} \times T_{exit}$;
$P_{HP}$ = Power in high power
$P_{LP}$ = Power in low power mode In some embodiments, if there is damage and the expected idle duration (listed in IIM register 930) is longer than the EBE time of the display, then the display driver 920 operates to configure the damage rectangle to the DCT activity register 932 and to signal the power management unit 940 to remove the display controller power (the DD Resp 1006 and DCT PWR bit 1008 shown in FIG. 10). The display driver 920 can monitor the busy bit on the DCT Activity register 932 and after it's cleared, can remove power on the DCT. In some embodiments:

(1) If there is no damage and the idle duration is greater than the EBE time, then the display driver 920 sets the bits DD Response 1006 and DCT power 1008, and the power management unit 940 removes power 950 to the display controller 944 in the frame itself.

(2) If the expected idle duration is shorter than the EBE time, then the DD response bit 1006 is not set, and:

(a) If there is screen damage, then the display driver 920 will configure the rectangle in the DCT register 932 to transmit the damaged area to the display.

(b) If there is no screen damage, then no rectangle information is configured in the DCT register 932. In some embodiments, this behavior is typically followed if the time to enter into the low power mode on display is longer than the expected idle duration.

(II) Display Power Management Decision Between Vblank Intervals: In some embodiments, when the display driver 920 reads the platform IIM information from the IIM register 930:

(1) When the expected idle duration is greater than EBE and there is damage, the display driver 920 posts the current damage rectangle to the DCT activity register 932 and acknowledges the power management unit 940 by writing the DD response bit 1006 on IIM register 930. However, the display driver 920 does not set the DCT power bit 1008, and thus the power management unit 940 leaves the power ON for the display controller 944 in the current frame.

(2) When the expected idle duration is greater than EBE and if there is no damage, then the display driver 920 sets the DD Response bit 1006 and doesn't take any other action.

In both cases (1) and (2) above, optionally after receiving the next Vblank interrupt, if the platform is in a IIM state, then the power management unit 940 may determine to remove the power to the display controller 944 without waking the CPU (central processing unit) of the processor, but the power management unit 940 is required to determine that no damage has happened after the receipt of the interrupt.

(3) If the expected idle duration is less than the EBE, then no action is taken and the DD response bit 1006 is not set.

In some embodiments, in order to obtain damage data between Vblank intervals, a modification is made to a software interface between the display drivers and applications. In some embodiments, display functionality is modified to provide that, upon reading the IIM register, appropriate responsive action is taken on the display pipe line. For example, PMU firmware functionality may be updated to convey the IIM policy decisions to the display driver and to manage power and clock for the display controller as directed by the DPU driver.

A constraint may be present in certain software stacks where, as an optimization to reduce tear effect (in which information from multiple frames in shown in a single frame) on the display panel, applications are to copy their buffer data to the main frame buffer only at Vblank. In some embodiments, if a frame buffer damage rectangle is required to be committed to the display controller in between frames, then all outstanding buffer copies are required at this juncture to accomplish the damage commitment. In some embodiments, a callback function mechanism may be utilized to fetch all outstanding buffer copies from all the applications that are executing currently. In some embodiments, the fetching of outstanding buffer copies includes ensuring that there are no user-visible artifacts because different buffers could be committed in different frames. In some embodiments, if the ensuring that no use-visible artifacts are present is added to a graphics software stack, then further power savings for the display pipeline may be possible.

Figure 11:
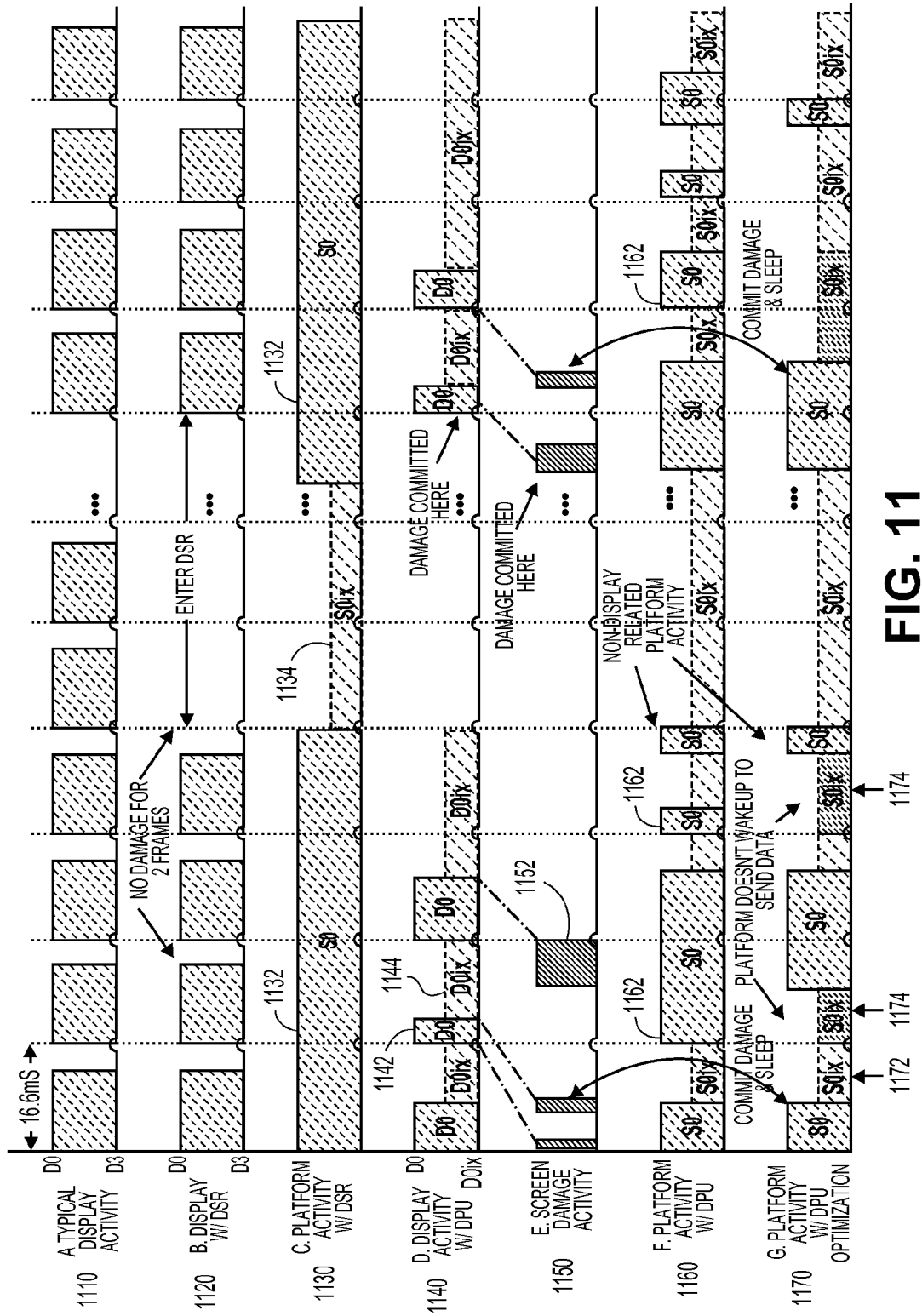
FIG. 11 is a timing diagram to illustrate operation of an embodiment of power management.

FIG. 11 is a timing diagram to illustrate operation of an embodiment of power management. In this illustration, display and system behavior are illustrated. FIG. 11 includes timing for typical display activity 1110, in which a frame is illustrated as commencing each 16.6 milliseconds. As illustrated, a display with DSR (Display Self-Refresh) 1120 provides a self-refresh stage, where DSR refers to an older (Gen-1) technology for display power manage in which, after a certain number of continuous frames of inactivity, the DCT is powered off and display data is sent to the panel. The platform activity with DSR 1130 illustrates the reduction of the platform from S0 1132 to an IIM 1134 state, thus allowing for a savings in power consumption. However, in active scenarios the configured number of continuous frames of inactivity to allow for the DSR period to be entered may rarely be reached, thus requiring the platform to remain in S0 state.

FIG. 11 further illustrates timing for display activity with DPU 1140, illustrating the activity at D0 1142 (a full-power active display state) and power reductions to D0ix 1144 (a reduced power display state). DPU provides an enhancement to DSR by transmitting only the damaged area, as shown in the screen damage activity 1150, such as damage portion 1152.

FIG. 11 then provides a timing diagram to illustrate the platform activity with DPU 1160, including certain non-display related platform activity. However, as shown, there are circumstances in which the platform wakes up or remains awake at periods in which no data is transmitted because there has been no damage requiring transmission of additional data, such as transitions 1162.

In some embodiments, a method, apparatus, or system includes DPU optimization 1170 to allow for additional power reduction using coordination between display power management and platform power management. As illustrated, in addition to previous transitions to IIM states 1172, in some embodiments a method, apparatus, or system provides for extended transitions or new transitions to a reduced power state, such as the periods 1174 indicating periods in which a system may remain in an IIM state. In some embodiments, a system may remain in the reduced power state because there is no screen damage requiring transmission of screen data and, with the coordination of platform power control and display power control, the system does not make unneeded transitions to an S0 power state.

Figure 12:
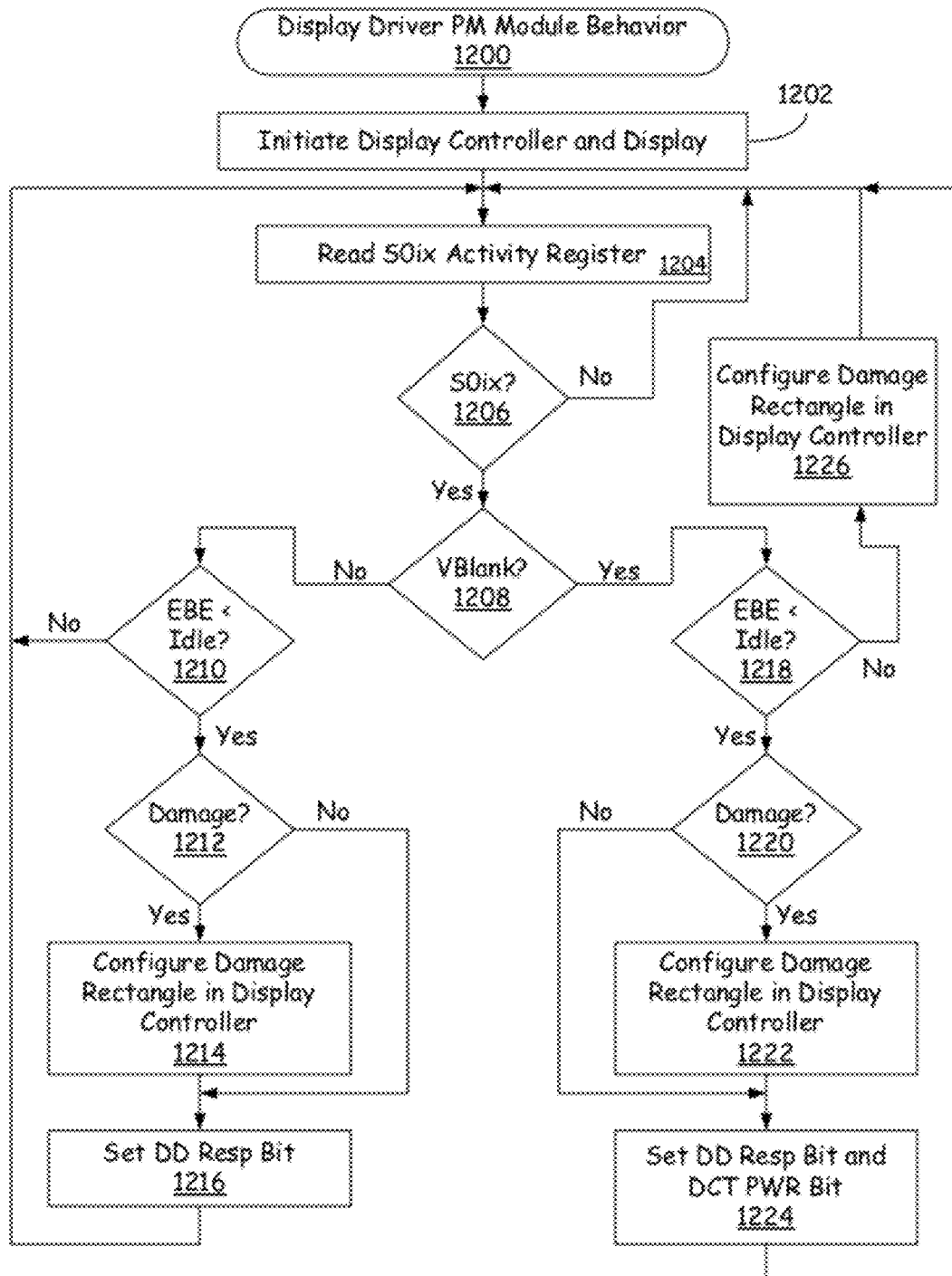
FIG. 12 is a flowchart to illustrate an embodiment of operations of a display driver power management module.

FIG. 12 is a flowchart to illustrate an embodiment of operations of a display driver power management module 1200. In some embodiments, a display controller and display may be initiated 1202, and the IIM activity register is read (where the register may be polled periodically). If the register indicates that the system is not able to transition to IIM 1206, then no action is taken and the system returns to reading the IIM register at the next time period. If the system is able to transition to IIM 1206, then there is determination whether a Vblank interrupt 1208 is received, where:

(a) If a Vblank interrupt 1208 is received, and the energy break-even time EBE is not less than the expected idle duration (from the IIM register) 1218 (indicating that there would be an energy cost in a transition to and from a lower power state), then the damage rectangle is configured in the display controller 1226 and the system returns to reading the IIM register at the next time period 1204. If EBE is less than the expected idle duration 1218 (indicating a potential energy savings in a transition to and from a lower power state) and there is screen damage 1220 then the damage rectangle is configured in the display controller 1222 and the DD response and the DCT power bit in the DCT activity register are set 1224. If there is no screen damage 1220, then the system proceeds to set the DD response and the DCT power bit in the DCT activity register 1224.

(b) If a Vblank interrupt 1208 is not received, and the energy break-even time EBE is not less than the expected idle duration 1210, then no action is taken and the system returns to reading the IIM register at the next time period 1204. If EBE is less than the expected idle duration 1210 and there is screen damage 1212 then the damage rectangle is configured in the display controller 1214 and the DD response bit in the DCT activity register is set 1216. If there is no screen damage 1212, then the system proceeds to set the DD response bit in the DCT activity register 1216.

Figure 13:
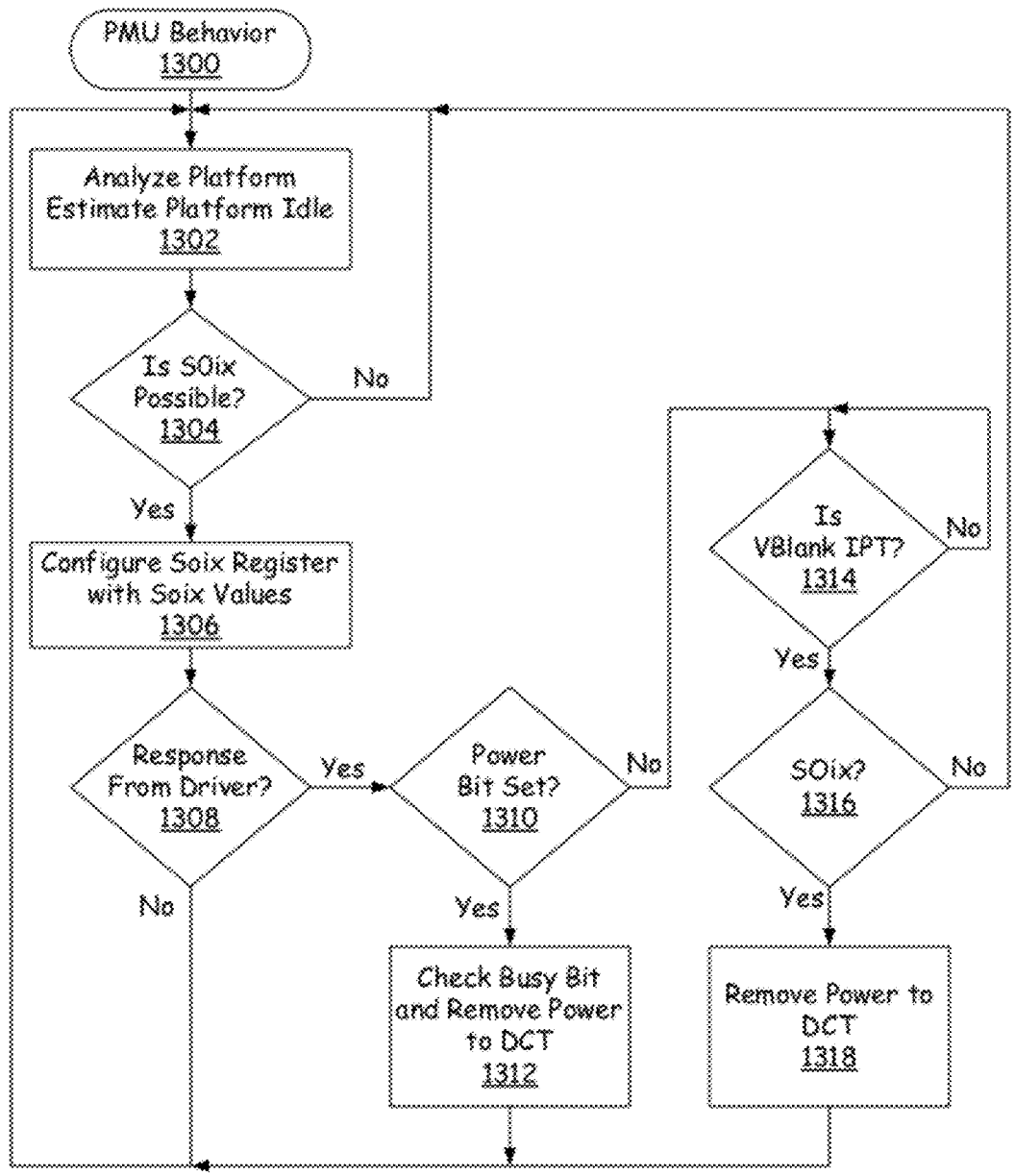
FIG. 13 is a flowchart to illustrate an embodiment of operations of a power management unit module.

FIG. 13 is a flowchart to illustrate an embodiment of operations of a power management unit module 1300. In some embodiments, an analysis is made of the platform 1302 including estimating platform idle conditions. If a reduced power (IIM) state is not possible 1304, there is no action and the system returns to analysis of the platform. If a reduced power state is possible 1304, then there the IIM register is configured with IIM values 1306. If there is a response from the display driver (which operates to read the status of the IIM register) 1308, then there is a determination whether a DCT power bit of the IIM register is set 1310. If not, then there is a check of the busy bit of the DCT activity register and a removal of power from the display controller 1312. If the DCT power bit of the IIM register is not set 1310, then there is a wait for a Vblank interrupt, shown by the determination whether the interrupt is received 1314. Upon receipt of the Vblank interrupt 1314, there is a determination whether the system is in an IIM state 1316, and, if so, the power to the display controller is removed 1318. If not, the process returns to analyzing the platform 1302.

Figure 14:
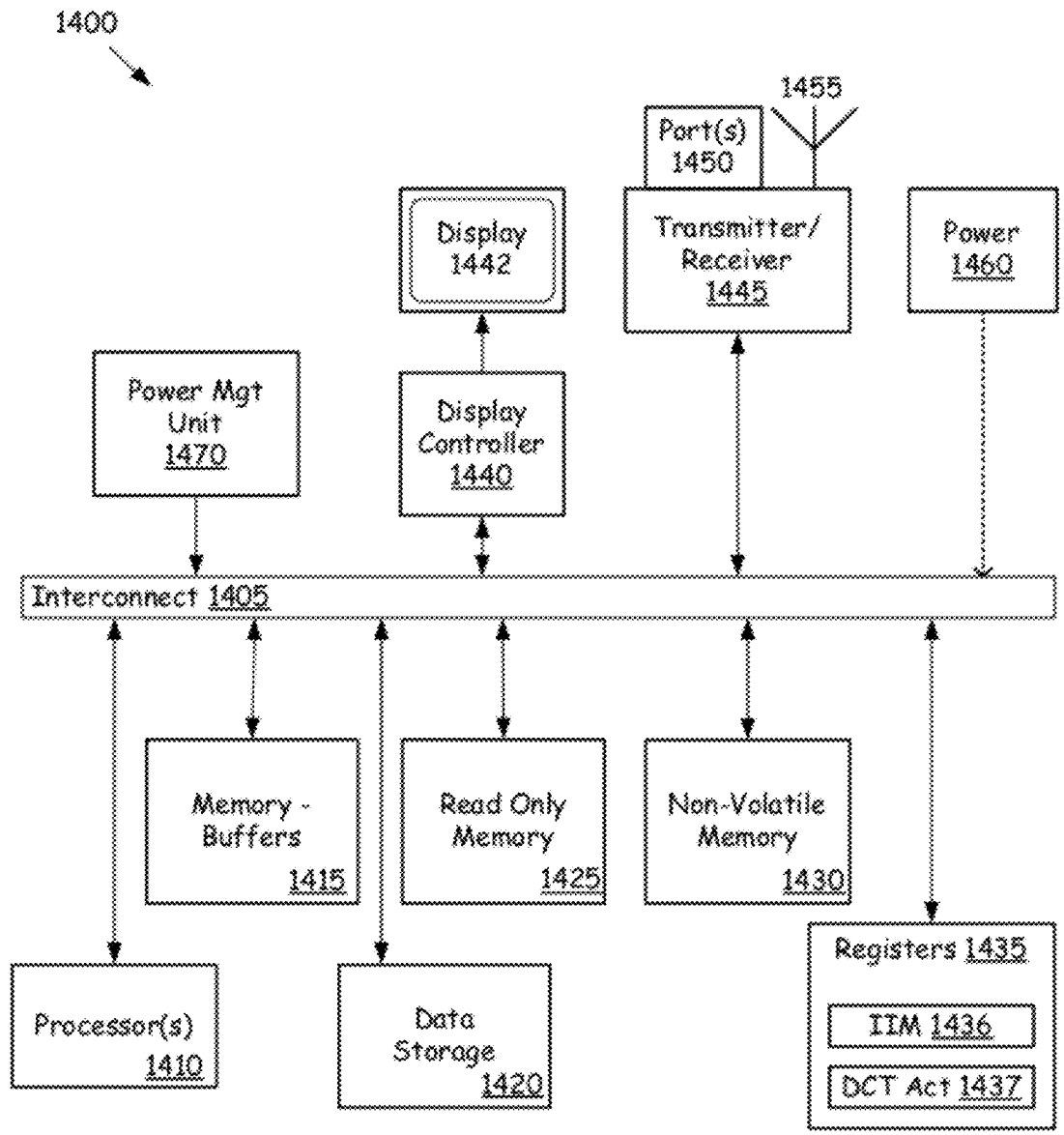
FIG. 14 illustrates an embodiment of a mobile device or other computing platform.

FIG. 14 illustrates an embodiment of a mobile device or other computing platform. In this illustration, certain standard and well-known components that are not germane to the present description are not shown. Under some embodiments, the mobile device or other computing platform (referred to herein generally as a device) 1400 comprises an interconnect or crossbar 1405 or other communication means for transmission of data. The device 1400 may include a processing means such as one or more processors 1410 coupled with the interconnect 1405 for processing information. The processors 1410 may comprise one or more physical processors and one or more logical processors. The interconnect 1405 is illustrated as a single interconnect for simplicity, but may represent multiple different interconnects or buses and the component connections to such interconnects may vary. The interconnect 1405 shown in FIG. 14 is an abstraction that represents any one or more separate physical buses, point-to-point connections, or both connected by appropriate bridges, adapters, or controllers.

In some embodiments, the device 1400 further comprises a random access memory (RAM) or other dynamic storage device or element as a main memory and other memory (including memory buffers) 1415 for storing information and instructions to be executed by the processors 1410. The memory 1415 may include one or more frame buffers for the storage of video data. Memory 1415 also may be used for storing data for data streams or sub-streams. RAM memory includes dynamic random access memory (DRAM), which requires refreshing of memory contents, and static random access memory (SRAM), which does not require refreshing contents, but at increased cost. DRAM memory may include synchronous dynamic random access memory (SDRAM), which includes a clock signal to control signals, and extended data-out dynamic random access memory (EDO DRAM). The device 1400 also may comprise a read only memory (ROM) 1425 or other static storage device for storing static information and instructions for the processors 1410. The device 1400 may include one or more non-volatile memory elements 1430, including, for example, flash memory, for the storage of certain elements.

Data storage 1420 may also be coupled to the interconnect 1405 of the device 1400 for storing information and instructions. The data storage 1420 may include a magnetic disk, an optical disc and its corresponding drive, or other memory device. Such elements may be combined together or may be separate components, and utilize parts of other elements of the device 1400.

In some embodiments, memory of the system may include certain registers or other special purpose memory 1435. In some embodiments, registers 1435 may include an IIM register 1436, such as 930 illustrated in FIGS. 9 and 10, and a display controller activity register 1437, such as register 932 illustrated in FIG. 9.

In some embodiments, the device 1400 may further include a power management unit 1470 for the management of power in the device, where the power management unit may access the IIM register 1436 in connection with management of the power of the device platform. In some embodiments, the device 1400 may further include a display controller 1440 coupled with a display 1442, wherein the display controller may access the display controller activity register 1437. In some embodiments, the device operates to coordinate platform power control with display power control to allow for transition of the device to a lower power state when the display controller 1440 is not actively providing updates to the display 1442. In some embodiments, the display 1442 may include a liquid crystal display (LCD) or any other display technology, for displaying information or content to a user. In some environments, the display 1442 may include a touch-screen that is also utilized as at least a part of an input device. In some environments, the display 1442 may include an audio device, such as a speaker for providing audio information.

One or more transmitters or receivers 1445 may also be coupled to the interconnect 1405. In some embodiments, the device 1400 may include one or more ports 1450 for the reception or transmission of data. The device 1400 may further include one or more antennas 1455 for the transmission and reception of data via radio signals.

The device 1400 may also comprise a power device or system 1460, which may comprise a power supply, a battery, a solar cell, a fuel cell, or other system or device for providing or generating power. The power provided by the power device or system 1460 may be distributed as required to elements of the device 1400. In some embodiments, the power management unit 1470 operates to control consumption of power from the power device or system 1460 through the coordination of platform power management with display power management.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs which are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, compact disk read-only memory (CD-ROM), and magneto-optical disks, read-only memory (ROM), random access memory (RAM), erasable programmable read-only memory (EPROM), electrically-erasable programmable read-only memory (EEPROM), magnet or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the embodiments of the present invention is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example of the present invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the present invention, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. An apparatus comprising:
   a display controller to transfer pixel data from a frame buffer to a video display;
   a detection element to track updates to the frame buffer, the detection element to identify a portion of the pixel data that has been changed from a previous image; and
   a power management unit to provide power management for the apparatus, wherein the power management unit is to determine whether to turn off power to the display controller based at least in part on:
      whether the display controller has pending video data for the video display; and
      whether energy that can be saved by transitioning the apparatus to a reduced power state is sufficient to offset energy that would be used to transition into and out of the reduced power state;
   wherein the display controller is to provide the video display with the identified portion of the pixel data.

2. The apparatus of claim 1, wherein the portion of the pixel data is a rectangle of pixel data.

3. The apparatus of claim 1, wherein the display controller is to provide partial update data to the video display without providing at least one portion of the pixel data that has not been changed from the previous image.

4. The apparatus of claim 1, further comprising:
   a first memory element, the first memory element to include information regarding power management for the apparatus; and
   a second memory element, the second memory element to include information regarding whether the display controller is scheduled to transmit data to the video display.

5. The apparatus of claim 4, wherein the first memory element and the second memory element are registers.

6. The apparatus of claim 4, wherein the power management unit is to utilize the first memory element to indicate to a display driver that the apparatus is prepared to enter a reduced power state.

7. The apparatus of claim 6, wherein the reduced power state is an intermediate idle mode power state.

8. The apparatus of claim 1, wherein the apparatus is a mobile device.

9. A method comprising:
   transmitting a first set of video data for a first image to a video display for a first data frame;
   determining by a detection element whether any portion of the first set of video data has changed, wherein determining whether any portion of the first set of video data has changed includes the detection unit tracking updates to a frame buffer;
   if a portion of the video data has changed, generating a second set of video data, the second set of video data representing the portion of the video data that has changed, and sending the second set of video data to the video display for a second data frame; and
   determining by a power management unit whether to transition into a reduced power state based at least in part on:
      whether there is pending video data for the video display, and
      whether energy that can be saved by transitioning to the reduced power state is sufficient to offset energy that would be used to transition into and out of the reduced power state.

10. The method of claim 9, further comprising generating at the video display a second image for the video display, the second image being the first image modified by the second set of video data.

11. The method of claim 9, wherein the second set of video data comprises a rectangle of the first image that has changed since the first data frame.

12. The method of claim 9, wherein a first register includes information regarding platform power management.

13. The method of claim 9, wherein a second register includes information identifying whether there is video data pending for the video display, and wherein determining whether to transition into the reduced power state includes reading information from the second register.

14. The method of claim 13, wherein the reduced power state is an intermediate idle mode power state.

15. A system comprising:
a video display;
a display driver for the video display;
dynamic random access memory including a frame buffer to hold pixel data for the video display;
a display controller to transfer pixel data from the frame buffer to the video display;
a detection element to track updates to the frame buffer, the detection element to identify a portion of the pixel data that has been changed from a previous image; and
a power management unit to provide power management for the system, wherein the power management unit is to determine whether to transition the system into a reduced power state based at least in part on:
whether the display controller has pending video data for the video display; and
whether energy that can be saved by transitioning the system to the reduced power state is sufficient to offset energy that would be used to transition into and out of the reduced power state;
wherein the display controller is to provide the video display with the identified portion of the pixel data.

16. The system of claim 15, further comprising a remote frame buffer to hold pixel data for the video display.

17. The system of claim 15, wherein the portion of the pixel data is a rectangle of pixel data.

18. The system of claim 15, wherein the display controller is to provide partial update data to the video display without providing at least one portion of the pixel data that has not been changed from the previous image.

19. The system of claim 18, wherein the video display is operable to retain the image when no updates are made to the image.

20. The system of claim 15, further comprising:
a first memory element, the first memory element to include information regarding power management for the system; and
a second memory element, the second memory element to include information regarding whether the display controller is scheduled to transmit data to the video display.

21. The system of claim 20, wherein the first memory element and the second memory element are registers.

22. The system of claim 20, wherein the power management unit is to utilize the first memory element to indicate to a display driver that the system is prepared to enter a reduced power state.

23. The system of claim 22, wherein the reduced power state is an intermediate idle mode power state.

24. The system of claim 15, wherein the system is a mobile device.

25. The apparatus of claim 1, wherein the determination by the power management unit whether energy that can be saved by transitioning to the reduced power state is sufficient to offset energy that would be used to transition into and out of the reduced power state includes the power management unit comparing an idle time with an energy break-even time.

26. The method of claim 9, wherein the determination by the power management unit whether energy that can be saved by transitioning to the reduced power state is sufficient to offset energy that would be used to transition into and out of the reduced power state includes comparing by the power management unit an idle time with an energy break-even time.

27. The system of claim 15, wherein the determination by the power management unit whether energy that can be saved by transitioning to the reduced power state is sufficient to offset energy that would be used to transition into and out of the reduced power state includes the power management unit comparing an idle time with an energy break-even time.

* * * * *